United States Patent

Hernqvist

[15] 3,639,804
[45] Feb. 1, 1972

[54] ION DISCHARGE TUBE EMPLOYING CATAPHORETIC TECHNIQUES

[72] Inventor: Karl G. Hernqvist, Princeton, N.J.
[73] Assignee: RCA Corporation
[22] Filed: Apr. 4, 1969
[21] Appl. No.: 813,485

[52] U.S. Cl. ............................ 315/108, 313/207, 313/220, 313/223, 331/94.5
[51] Int. Cl. .......................................................... H01j 17/22
[58] Field of Search ........................ 313/207, 209, 227, 230; 315/108; 331/94.5

[56] References Cited

UNITED STATES PATENTS 3,464,025 8/1969 Bell ........................................ 331/94.5

Primary Examiner—Raymond F. Hossfeld
Attorney—Edward J. Norton

[57] ABSTRACT

Disclosed are several embodiments of a metal vapor laser having a window at each end in which cataphoretic means are employed for both propagating the metal vapor between a vapor source and a condenser and for preventing condensation of the metal vapor on one or both of the windows. The cataphoretic means may include two or more spaced electrodes which are strategically placed along the length of the laser and which have applied thereto respective DC potentials of the proper polarity and value. Alternatively, the condenser may be omitted and a combination of both rectified and unrectified RF voltage of the proper values may be applied to the respective spaced electrodes of the metal vapor laser.

12 Claims, 7 Drawing Figures

INVENTOR
KARL G. HERNQVIST

BY George J. Seligsohn
ATTORNEY

ION DISCHARGE TUBE EMPLOYING CATAPHORETIC TECHNIQUES

This invention relates to discharge tubes, and, more particularly, to ion discharge tubes employing cataphoretic techniques.

Discharge tubes are often used to generate electromagnetic radiation at infrared, visible or ultraviolet wavelengths. In any given case, the wavelength or wavelengths which are generated depend both on the gaseous materials with which the tube is filled and the mode of operation of the tube.

Certain gases, such as the noble gases for instance, do not react either chemically or physically with any other element of the discharge tube and, therefore, inherently do not produce any detrimental effect on the operation of the discharge tube. However, there are situations where the required gas to produce radiation at a desired wavelength in a gas discharge device is capable of detrimentally reacting either physically or chemically with one or more elements of the discharge tube. For instance, chlorine gas tends to react chemically chemically with the material of which the tube cathode is composed.

Of particular interest, however, is the case of vapor ion discharge tubes. A vapor ion discharge tube includes a gas of a material, such as cadmium or mercury for instance, which are solid or liquid at room temperature. Therefore, there is a tendency for the vaporized material to condense on the walls of the tube, including one or more windows required to transmit the radiation generated by the discharge tube. This is detrimental to the operation of the tube, because the condensed vapor on a window is opaque to the radiation to be transmitted and also may be corrosive to the optical surface of the window.

It has been found that certain vapor ion discharge tubes are suitable for use in lasers. More particularly, such a vapor ion discharge tube is filled with a mixture containing a noble gas, such as helium, seeded with the ionizable vapor of materials, such as cadmium or mercury, which are solid or liquid at room temperature. Laser gas discharge tubes, including vapor ion discharge tubes, typically extend longitudinally from a first end thereof to a second end thereof. In order to operate as lasers, the tube is placed in an appropriate optical resonant cavity, which may be either external or internal. In the case of an external resonant cavity, ends of the tube are terminated by windows, which are usually oriented at Brewster's angle, and the optical resonant cavity consists of two external mirrors which are respectively located in cooperative location with each of the windows. At least one of the mirrors is only partially reflected, so that an output beam of radiation may be obtained. In the case of an internal optical resonant cavity, the ends of the laser gas discharge tube are terminated by members having reflective internal surfaces. However, again, at least one of the terminating end members is only partially reflective so as to also act as a window for obtaining the output beam of radiation from the laser.

Although some gas lasers, such as the helium-neon laser, obtain radiation from a glow discharge through gas in its neutral, or unionized state, many gas lasers, including vapor ion lasers, obtain radiation from an arc discharge through the gas in its ionized state.

One of the problems with lasers employing vapor ion discharge tubes has been that they have remained operative for only a few hours, since the vapor condenses on the windows of the laser tube to form a film which is relatively opaque to radiation emitted by the vapor ion discharge tube. In addition, in many cases, such as cadmium, for instance, the film of condensed material has a discoloring and corrosive effect on the optical surface of the window. This very short lifetime has limited the use of lasers employing vapor ion discharge tubes to laboratory work and has been made impractical their general use.

It is not possible to overcome this problem by the simple expedient of maintaining the windows of the vapor discharge tube at a temperature above the condensation temperature of the vapor. One reason for this is that maintaining the windows of a laser at a temperature which is relatively high with respect to room temperature heats up and causes turbulence in the outside air in proximity to the windows of the vapor ion discharge tube. This turbulence causes erratic changes in the index of refraction of the air adjacent the windows and adversely effects the coherent wave energy emitted from the laser. In addition, operating either Brewster angle windows or the mirrors of internal resonant cavities at a temperature sufficiently high to prevent condensation of the vapor increases the corrosive effect of the vapor on these optical elements.

The present invention is directed to a technique which permits an ion discharge tube to be filled with a plurality of gases, one of which would normally produce a detrimental effect on an element of the tube located within a given region thereof, without the occurrence of such a detrimental effect. This is accomplished by providing cataphoretic means to establish a given electrostatic force for accelerating ions of this one gas away from the given region of the tube to a region thereof adjacent thereto and thereby lower the pressure and the molecular density of this one gas in the given region to a point below that at which any detrimental effect occurs to the element located therein. The present invention is particularly suitable for lowering the density of vapor molecules and the vapor pressure in a region of a vapor ion discharge tube contiguous with a given portion thereof, such as a window, by an amount which is sufficient to substantially prevent any accumulation of condensed vapor on this given portion during operation of the tube.

It is therefore an object of the present invention to provide a cataphoretic technique for extending the effective lifetime of certain types of ion discharge tubes employing a plurality of gases including a gas which is normally detrimental to the lifetime of the tube.

This and other objects, features and advantages of the present invention will become more apparent from the following detailed description taken together with the accompanying drawing in which.

Figure 1:
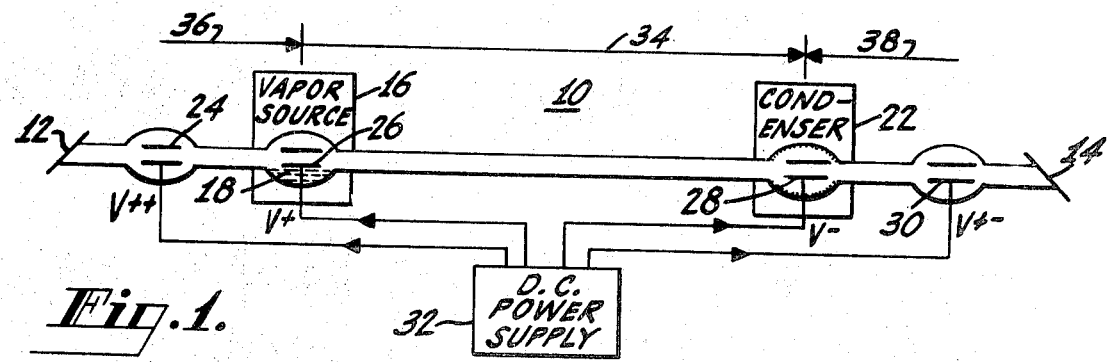
FIG. 1 illustrates in diagrammatic form a first embodiment of the present invention.

Referring now to FIG. 1, there is shown a longitudinal vapor ion discharge tube 10 in a form which is useful for use in lasers. The left end of tube 10 is terminated in Brewster angle window 12 and the right end of tube 10 is terminated in Brewster angle window 14. At a first given point of tube 10, spaced a certain distance from left window 12, is vapor source 16. Vapor source 16 includes an initial charge of a vaporizable and ionizable material, such as cadmium or mercury, in its nongaseous state within tube 10. Vapor source 16 may also include heating means, such as a heating coil surrounding tube 10 in the vicinity of material 18 or means for blowing hot air against tube 10 in the vicinity of material 18, to effect the vaporization of material 18. However, in certain cases where the heat generated by a discharge through tube 10 is sufficient to vaporize material 18, vapor source 16 need not include external heating means. Tube 10, in addition to being filled with the vapor of material 18 may also be filled with an ionizable normally gaseous material, such as helium, to aid in the formation of a discharge through the vapor, as is known in the art.

At a second given point along the length of tube 10, located as shown to the right of the first given point and at a certain distance from right window 14, is situated condenser portion 22. The inner surface of tube 10 in the region of condenser portion 22 is maintained at a temperature no higher than that required to condense vapor of material 18. Condenser portion 22 may include external air- or water-cooling means. However, in some cases, where the shape and size of the walls of tube 10 in the vicinity of condenser portion 22 is such that the inherent operating temperature of the inner surface of tube 10 at the second given point is below the condensation temperature, no external cooling means is required.

As shown, tube 10 has four electrodes positioned therein; namely, electrode 24 situated intermediate left window 12 and the first given point at which vapor source 16 is located, electrode 26 situated at the first given point at which vapor source 16 is located, electrode 28 situated at the second given point at which condenser portion 22 is located, and electrode 30 situated intermediate the second given point at which condenser portion 22 is located and right window 14. Each of electrodes 24, 26, 28 and 30 are respectively connected to a separate one of four output terminals of DC power supply 32. Each of the output terminals of DC power supply 32 operates at a different relative potential. More particularly, the potential $V^+$ applied to electrode 26 is sufficiently positive with respect to the potential $V^-$ applied to electrode 28 to maintain an ionized vapor discharge plasma in the region between the first and second given points of tube 10 at which vapor source 16 and condenser portion 22 are respectively located. The potential $V^{++}$ applied to electrode 24 is at a relative positive potential with respect to the potential $V^+$ applied to electrode 26 by at least a certain amount to be discussed in more detail below.

Similarly, the potential $V^{+-}$ applied to electrode 30 is at a positive potential with respect to the potential $V^-$ applied to electrode 28 by at least a certain amount to be discussed in more detail below.

Considering now the operation of the apparatus shown in FIG. 1, vapor source 16 vaporizes at least a portion of material 18, which vapor mixes with any other gas or gases with which tube 10 is filled. Ionized plasma is formed in tube 10 in response to the potential difference which exists between electrodes 26 and 28. Further, the potential difference between electrodes 26 and 28 results in a potential gradient existing in the region between the first and second given points of tube 10, which potential gradient is directed from the first given point toward the second given point, as indicated by arrow 34. Since vapor ions in the plasma are positively charged, they will be accelerated by the electrostatic force of this potential gradient in a direction from vapor source 16 to condenser portion 22. This tendency of the vapor ions to be transported from vapor source 16 to condenser portion 22 under the influence of the electrostatic force therebetween is known as cataphoresis.

Despite the cataphoretic transportation of vapor ions from vapor source 16 towards condenser 22, many vapor ions and molecules will diffuse into the region of tube 10 to the left of vapor source 16. Ordinarily these diffused vapor molecules and ions would condense on window 12, forming an opaque and often corrosive film of material 18 thereon. However, due to the relative positive potential of electrode 24 with respect to the potential of electrode 26, a cataphoretic force, indicated by arrow 36, exists for pumping vapor ions and molecules which have diffused into the region of tube 10 located to the left of vapor source 16 back into the region between vapor source 16 and condenser portion 22. This maintains the density of vapor molecules and ions and the vapor pressure in the region of tube 10 contiguous with window 12 at a relatively low value with respect to that in the region between vapor source 16 and condenser portion 22 which depends upon the potential difference between electrodes 24 and 26. By making the potential difference between electrodes 24 and 26 at least equal to a given value, the density of vapor molecules and ions and the vapor pressure in the region of tube 10 contiguous with window 12 may be maintained at a value which is below that required for any significant accumulation of condensed vapor molecules on window 12.

In more quantitative terms, consider a discharge column confined in a tubing of length L over which a voltage drop V is present. Assume that the plasma is seeded with a low ionization potential metal vapor and that the degree of ionization $\alpha$ is a constant. Balance between cataphoretic drift and back diffusion dictates $$N^+ \mu_+ V/L = D \text{ grad } N$$

where
$N^+$ = ion vapor density
$\mu_+$ = ion mobility
$D$ = diffusion constant
$N$ = neutral vapor density
Using
$N^+ = \alpha N$ it is obtained.

$$\frac{N_o}{N_L} = \exp\left(\frac{-\mu_+ V \alpha}{D}\right) = \exp\left(-\frac{eV\alpha}{\sqrt{2kT_+}}\right)$$

where $T_+$ = ion temperatures, and $No$ and $N_L$ are the vapor densities at the two ends of the column. For typical values $\alpha = 1/0$, $T_+ = 1,000°$ K. and $V = 10$ volts, $No/N_L \cong 10^{-4}$, thus a very large vapor density ratio.

In a similar manner, the relatively positive potential of electrode 30 with respect to electrode 28 provides a cataphoretic force, indicated by arrow 38, which is sufficient to substantially prevent accumulation of any condensed vapor molecules on window 14. Therefore, windows 12 and 14 remain transparent to radiation emitted by the vapor plasma of tube 10 and the lifetime of tube 10 is not reduced by condensed vapor accumulation on windows 12 and 14.

Figure 2:
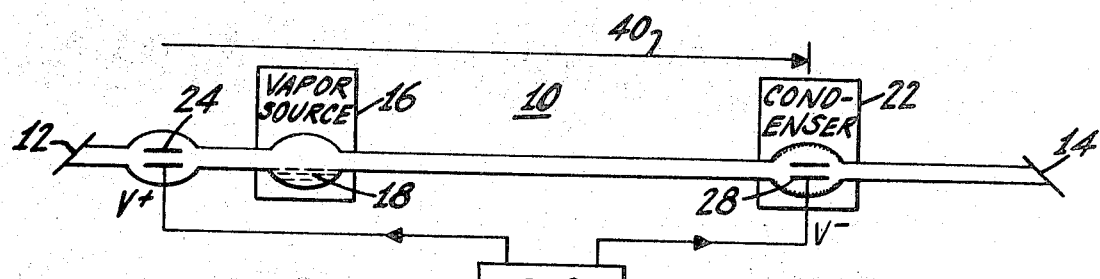
FIG. 2 illustrates a first modification of the first embodiment shown in FIG. 1.

FIG. 2 shows a first stripped down modification of the embodiment of FIG. 1. More particularly, the structure of FIG. 2 is identical to that of FIG. 1 except for the omission of electrodes 26 and 30 and the fact that DC power supply 32a has only two terminals, one of which applies a positive potential to electrode 24 and the other of which applies a negative potential to electrode 28. There will be a cataphoretic potential gradient, indicated by arrow 40 extending in a direction from electrode 24 to electrode 28 within condenser portion 22. Although the first given point at which the source 16 is located is not directly connected to the power supply in FIG. 2, it will assume some given potential which is relatively negative with respect to the potential applied to electrode 24 and is relatively positive with respect to the potential applied to electrode 28. By providing a sufficient potential difference between the potentials applied to electrodes 24 and 28 in FIG. 2 the cataphoretic effect may be made sufficiently strong to substantially prevent accumulation of any condensed vapor on window 12. However, in FIG. 2 only the condensing of the vaporized material in condenser portion 22 is relied upon for preventing a sufficient density of vapor ions and molecules and a sufficient vapor pressure within the portion of tube 10 to the right of condenser 22 in FIG. 2 to substantially prevent any accumulation of condensed vapor on window 14.

Figure 3:
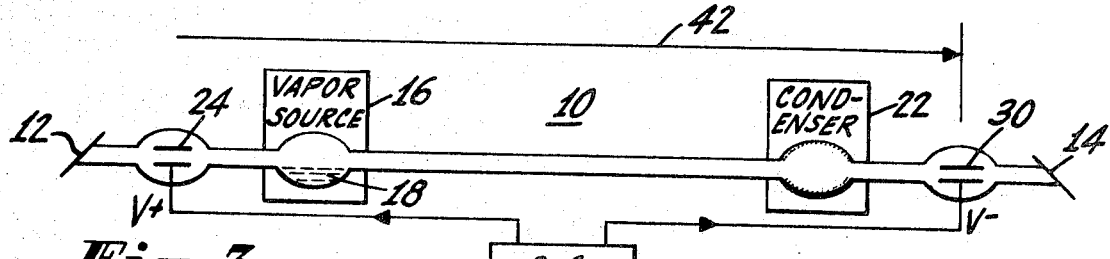
FIG. 3 illustrates a second modification of the first embodiment shown in FIG. 1.

FIG. 3 shows a second stripped down modification of the embodiment shown in FIG. 1. More particularly, the structure of FIG. 3 is identical to that of FIG. 1 except that electrodes 26 and 28 have been omitted and DC power supply 32b has only two outputs, one of which applies a positive potential to electrode 24 and the other of which applies a negative potential to electrode 30 to provide a cataphoretic potential gradient indicated by arrow 42. This will result in the first given point, at which vapor source 16 is located, assuming some first given potential and the second given point, at which condenser portion 22 is located, assuming some second given potential. This first given potential will be relatively negative with respect to the potential of electrode 24 and relatively positive with respect to both the second given potential and the potential of electrode 30. The second given potential will be relatively negative with respect to the potential of electrode 24 and the first given potential and will be relatively positive with respect to the potential of electrode 30. Potential gradient 42 has a value which is at least sufficient to keep the density of vapor ions and molecules and the vapor pressure below that required for the occurrence of any significant accumulation of condensed vapor material on window 12. As in FIG. 2, the embodiment of FIG. 3 relies on the condensation of vapor in condenser portion 22 to substantially prevent any significant accumulation of condensed vapor material on window 14.

The lifetime of tube 10 in the embodiment shown in FIG. 1, as well as in each of the stripped down modifications shown in FIGS. 2 and 3, is limited by the fact that ultimately, although it will take a very considerable amount of time, substantially all of material 18 of vapor source 16 will have been vaporized, then cataphoretically transported to condenser portion 22, and then condensed therein. For instance, if the charge of vaporizable material is 10 grams, and the rate of evaporation is 10 milligrams per hour, the lifetime of the tube will be 1,000 hours. This "one shot" operation of the embodiment shown in each of FIGS. 1–3, which limits its lifetime, is overcome in the respective embodiments shown in each of FIGS. 4 and 5.

Figure 4:
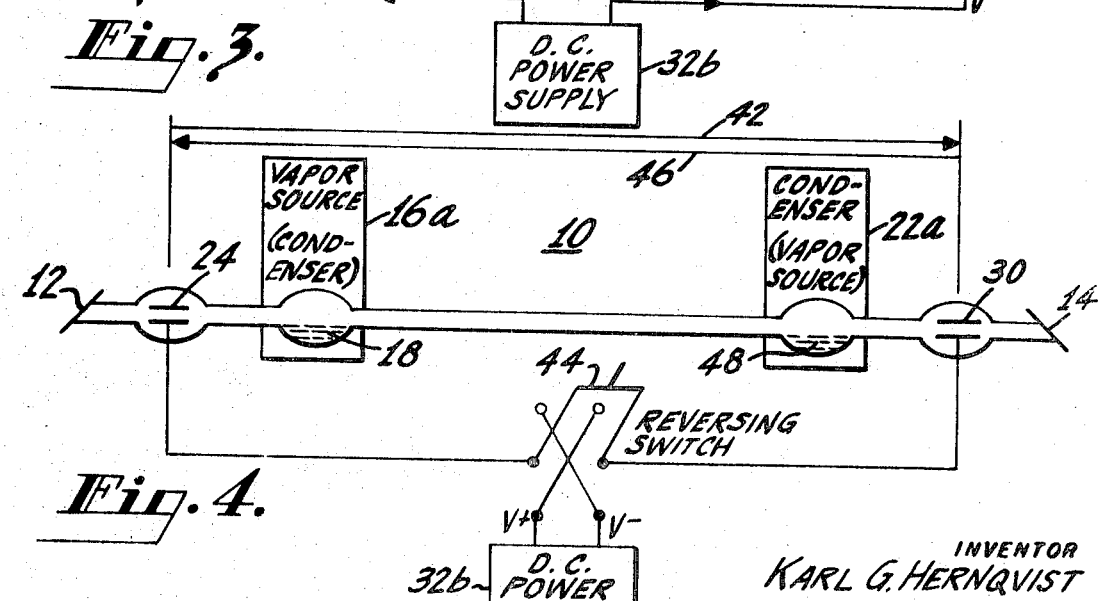
FIG. 4 illustrates in diagrammatic form a second embodiment of the present invention.

In FIG. 4 vapor source 16a in cooperative relationship with material 18 at the first given point is alternatively operable as a condenser. Also, condenser 22a in cooperative relationship with the second given point of tube 10 is alternatively operable as a vapor source. In other words, each of elements 16a and 22a have the capabilities of both elements 16 and 22 in each of FIGS. 1–3. Also tube 10, in FIG. 4, is assumed to have left-right symmetry about its middle. Further, in FIG. 4 reversing switch 44 is provided for applying a positive potential to electrode 24 and a negative potential to electrode 30 when reversing switch 44 is in its upper position and for applying a negative potential to electrode 24 and a positive potential to electrode 30 when reversing switch 44 is in its lower position.

Initially, the structure of FIG. 4 is operated with elements 16a operating as a vapor source, element 22a operating as a condenser and with reversing switch 44 in its upper position. In this case, the arrangement of FIG. 4 is effectively identical to that shown in FIG. 3 and whose operation is discussed above in connection with FIG. 3. However, in the case of FIG. 4, when all the material 18 has been evaporated, then cataphoretically transported between the first and second given points and then condensed by element 22a in the region of the second given point, as indicated by reference numeral 48, element 16a at this time may be alternatively operated in its condenser mode, element 22a may be alternatively operated in its vapor source mode and reversing switch 44 may be placed in its lower position. In this latter case, a cataphoretic potential gradient exists between electrodes 30 and 24 in the direction indicated by arrow 46. This will result in the evaporation of the condensed material 48, cataphoretic transportation of the vapor from element 22a back to element 16a and the recondensation of the material in the region of the first given point at which element 16a is located. After all the vapor has recondensed at the first given point, elements 16a may be again operated in its vapor source mode, element 22a may again be operated in its condenser mode, reversing switch 44 may again be placed in its upper position, and the whole process may be repeated. Although for simplicity, the two-electrode arrangement of FIG. 3 has been shown in FIG. 4, the four-electrode arrangement of FIG. 1 is suitable for use in the embodiment of FIG. 4 with a four output DC power supply. However, in this latter case, a more involved reversing switch would be required to properly switch the four potential outputs of the power supply.

Figure 5:
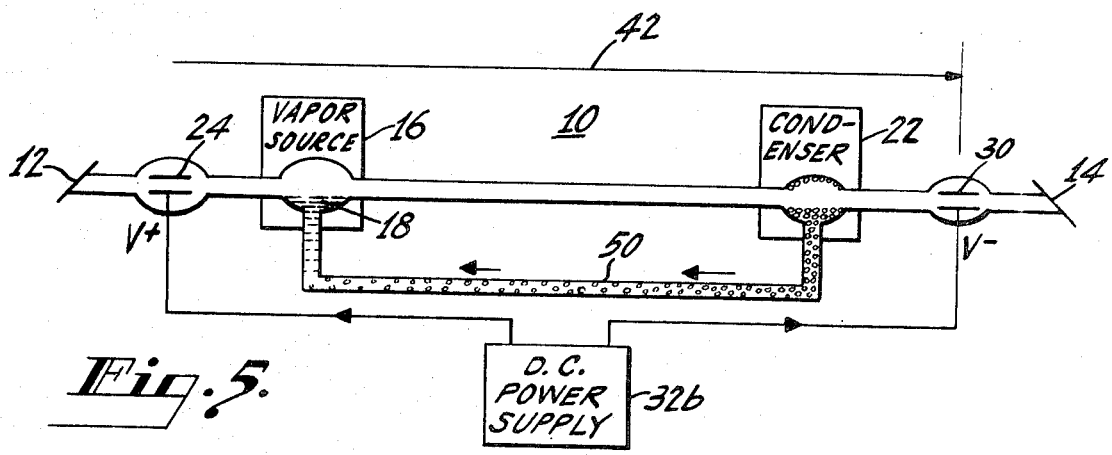
FIG. 5 illustrates in diagrammatic form a third embodiment of the present invention.

The arrangement in FIG. 5 is identical to that of FIG. 3 except that an auxiliary tube 50 provides a return path between condenser portion 22 and vapor source 16. The configuration of auxiliary tube 50 with respect to the region of tube 10 which directly connects the first and second given points thereof is such as to limit the vapor plasma to the main portion of tube 10. In FIG. 5, the cataphoretic transportation of vapor from vapor source 16 to condenser portion 22, as described above, results in a relatively higher vapor pressure at the second given point at which condenser portion 22 is located than the vapor pressure at the first given point at which vapor source 16 is located. This cataphoretically produced difference in vapor pressure is sufficient to pump most of the vaporized material cataphoretically transported from vapor source 16 to condenser portion 22 back to vapor source 16 through return path provided by auxiliary tube 50. In the case where material 18 is normally a liquid, as is mercury, condensed liquid is also forced from condenser portion 22 to vapor source 16 through auxiliary tube 50 by this difference in vapor pressure.

Although for simplicity tube 10 in FIG. 5 has been shown with only two electrodes, it is clear that the four-electrode arrangement with a four output DC power supply of FIG. 1 is equally suitable for use with the arrangement shown in FIG. 5.

Figure 6:
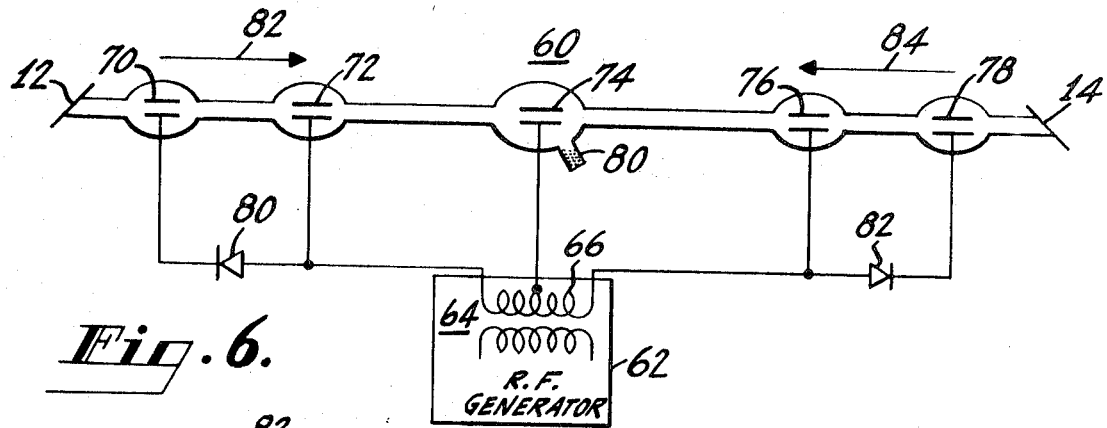
FIG. 6 illustrates in diagrammatic form a fourth embodiment of the present invention.

Referring to FIG. 6, there is shown a longitudinal vapor ion discharge tube having an initial charge of vaporizable material 80, such as cadmium or mercury, located as shown in the midregion thereof. Tube 60 is terminated at the left end by Brewster angle window 12 and is terminated at the right end by Brewster angle window 14. Symmetrically located within tube 60 with respect to the middle thereof are electrodes 70, 72, 74, 76 and 78.

Radio frequency generator 62 is provided with output transformer 64 having a center tap winding 66 across which is derived an alternating current voltage at radio frequency. The center tap of secondary winding 66 is connected to centrally located electrode 74. The left end of secondary winding 66 is connected through rectifier 80 to electrode 70, which is in proximity to left window 12, and is connected directly to electrode 72, which is located intermediate electrode 70 and electrode 74. Rectifier 80 is poled so that electrode 70 will assume a positive potential with respect to that of electrode 72. This will result in a cataphoretic potential gradient having the direction indicated by arrow 82 existing between electrode 70 and electrode 72. In a similar manner, right side of secondary winding 66 is connected to electrode 78 through rectifier 82 and is directly connected to electrode 76 to provide a cataphoretic potential gradient in the direction indicated by arrow 84 between electrode 78 and electrode 76.

A discharge between electrode 72 and 76 in response to the alternating current radio frequency voltage supplied therebetween by secondary winding 66 of RF generator 62 will result in sufficient heat to vaporize material 80. Further, there will be no effective cataphoretic effect causing transportation in either direction between electrodes 72 and 76 because of reversal in polarity of the voltage applied to electrode 72 and 76 each half-cycle of the RF frequency. However, due to the presence of rectifiers 80 and 82, respectively, electrode 70 will assume a positive potential with respect to that of electrode 72 and electrode 78 will assume a positive potential with respect to that of electrode 76, resulting in potential gradients 82 and 84, as discussed above. The cataphoretic effects of potential gradients 82 and 84, respectively, are sufficient in magnitude to maintain the respective regions of tube 60 in contiguous relationship with window 12 and window 14, respectively, at a sufficiently low density of vapor ions and molecules and a sufficiently low vapor pressure to substantially prevent any accumulation of condensation of vapor on either window 12 or window 14.

Figure 7:
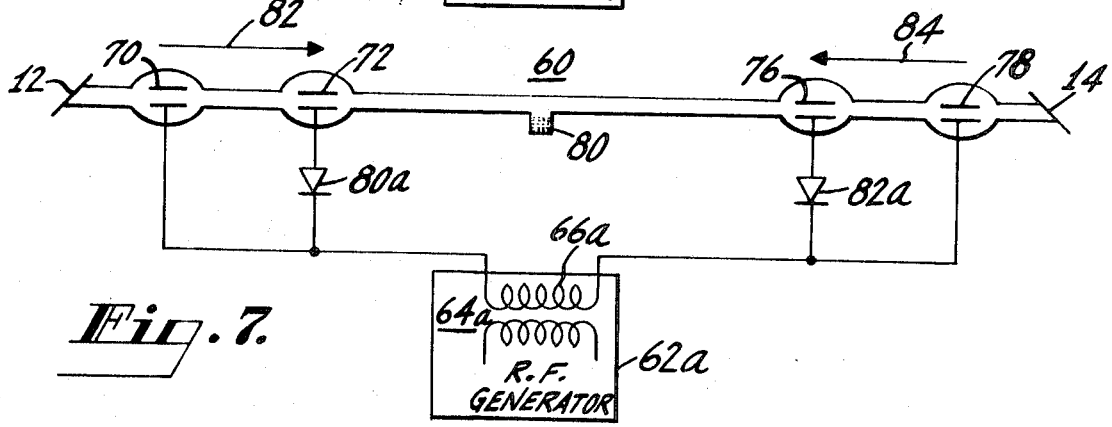
FIG. 7 illustrates a modification of the fourth embodiment shown in FIG. 6.

FIG. 7 shows a slightly different structure for performing the same results as the structure shown in FIG. 6. More particularly, in FIG. 7 central electrode 74 is dispensed with and secondary winding 66a of output transformer 64a of RF generator 62a does not have a center tap. Further, the left end of secondary winding 66a is applied directly to electrode 70 and through rectifier 80a to electrode 72, while the right end of secondary winding 66a is applied directly to electrode 78 and through rectifier 82a to electrode 76. Rectifiers 80a and 82a, respectively, are poled to maintain electrode 70 at a positive potential with respect to the potential of electrode 72 to provide potential gradient 82 therebetween, while rectifier 82a is poled to maintain electrode 78 at a positive potential with respect to the potential of electrode 76 to provide potential gradient 84 therebetween. In all other respects, the operation of structure shown in FIG. 7 is identical to that of the structure shown in FIG. 6.

I claim:

1. In combination, a vapor ion discharge tube filled with at least two ionizable gases including ionized vapor of a normally nongaseous condensed material within said tube, said tube having a window for transmitting radiation from vapor molecules of said material in response to a discharge through said tube, and cataphoretic means responsive to energization thereof for establishing a discharge within said tube and for substantially preventing any accumulation of condensed vapor material on said window, wherein said tube includes a discrete vapor source of said material situated at a given position within said tube which is at some electrical potential during the presence of a discharge through said tube, wherein said cataphoretic means includes an electrode within said tube which is situated intermediate said window and said given position and electrical means to maintain said electrode at a sufficiently positive potential with respect to the potential at said given position to keep the number of vapor molecules in contact with said window below that required to effect condensation of said vapor material on said window, wherein said cataphoretic means includes a second electrode within said tube which is situated on the opposite side of said given position from said first-mentioned electrode, said electrical means being coupled to said second electrode for maintaining said second electrode at a negative potential with respect to the potential at said given position sufficient to maintain a discharge in the space between said source and said second electrode, and wherein said cataphoretic means includes a third electrode at said given position, said electrical means being coupled to said third electrode for maintaining said third electrode at a fixed potential.

2. In combination, a vapor ion discharge tube filled with at least two ionizable gases including ionized vapor of a normally nongaseous condensed material within said tube, said tube having a window for transmitting radiation from vapor molecules of said material in response to a discharge through said tube, and cataphoretic means responsive to energization thereof for establishing a discharge within said tube and for substantially preventing any accumulation of condensed vapor material on said window, wherein said tube includes a discrete vapor source of said material situated at a given position within said tube which is at some electrical potential during the presence of a discharge through said tube, wherein said cataphoretic means includes an electrode within said tube which is situated intermediate said window and said given position and electrical means to maintain said electrode at a sufficiently positive potential with respect to the potential at said given position to keep the number of vapor molecules in contact with said window below that required to effect condensation of said vapor material on said window, wherein said tube extends longitudinally from a first end thereof to a second end thereof and includes said window at said first end thereof and a second window at said second end thereof, wherein said tube includes a condenser portion situated at a second given position between said first given position and said second end, and wherein said cataphoretic means includes a second electrode situated at a distance from said second end which is no greater than the distance of said second given position from said second end, said electrical means being coupled to said second electrode for maintaining said second electrode at a negative potential with respect to the potential at said first-mentioned given position sufficient to maintain a discharge in the space between said vapor source and said condenser portion, whereby ionized vaporized material from said source is cataphoretically transported from said first-mentioned given position to said second given position and condensed in said condenser portion of said tube.

3. The combination defined in claim 2, wherein said second electrode is situated intermediate said second given position and said second end.

4. The combination defined in claim 3, wherein said cataphoretic means further includes selectively operated means for reversing the polarity of the potential difference between said first-mentioned electrode and said second electrode, and wherein said vapor source is alternatively selectively operable as a second condenser and said condenser portion is alternatively selectively operable as a second vapor source, whereby said material may be cataphoretically transported in either direction between said first and second given positions.

5. The combination defined in claim 2, wherein said second electrode is located at said second given position.

6. The combination defined in claim 5, wherein said cataphoretic means includes a third electrode at said first-mentioned given position and a fourth electrode intermediate said second given position and said second end, said electrical means being coupled to said third electrode for maintaining said third electrode at a fixed potential and being coupled to said fourth electrode for maintaining said fourth electrode at a sufficiently positive potential with respect to the potential of said second electrode to keep the number of vapor molecules in contact with said second window below that required to effect condensation of said vapor material on said second window.

7. The combination defined in claim 2, including an auxiliary tube in which no discharge takes place interconnecting said condenser portion to said vapor source of said first-named tube for transporting said material from said condenser portion back to said vapor source in response to the cataphoretically produced difference in vapor pressure which exists between said second given position and said first given position of said first-named tube.

8. In combination, a vapor ion discharge tube filled with at least two ionizable gases including ionized vapor of a normally nongaseous condensed material within said tube, said tube having a window for transmitting radiation from vapor molecules of said material in response to a discharge through said tube, and cataphoretic means responsive to energization thereof for establishing a discharge within said tube and for substantially preventing any accumulation of condensed vapor material on said window, wherein said cataphoretic means includes alternating current generating means coupled to said gas in said tube for exciting said gas and producing a plasma therethrough, a first electrode situated at a given position within said tube in the region of said window a second electrode situated within said tube intermediate said window and said given position, and rectifying means connecting said first and second electrodes, said rectifying means being so poled as to cause said second electrode to be maintained at a positive potential with respect to said first electrode in response to the flow therebetween of plasma current produced by said alternating current generating means.

9. The combination defined in claim 8, wherein said tube extends longitudinally from a first end thereof to a second end thereof and includes said window at said first end thereof and a second window at said second end thereof, and wherein said cataphoretic means further includes a third electrode situated at a second given position within said tube in the region of said second window, a fourth electrode situated within said tube intermediate said third electrode and said second window, and second rectifying means connecting said third and fourth electrodes, said second rectifying means being so poled as to cause said fourth electrode to be maintained at a positive potential with respect to third electrode in response to the flow therebetween of plasma current produced by said alternating current generating means.

10. The combination defined in claim 9, wherein said first and third electrodes, respectively, are symmetrically disposed on either side of the middle of said tube and said second and fourth electrodes respectively are symmetrically disposed on either side of the middle of said tube.

11. The combination defined in claim 10, wherein said cataphoretic means includes a fifth electrode in the middle of said tube, and wherein said alternating current generating means includes in output transformer having a center-tapped secondary winding, one end of said secondary winding being connected directly to said first electrode and through said first-mentioned rectifying means to said second electrode, the other end of said secondary winding being connected directly to said third electrode and through said second rectifying means to said fourth electrode, and the center tap of said secondary winding being connected to said fifth electrode.

12. The combination defined in claim 10, wherein said alternating current generating means includes an output transformer having a secondary winding, one end of said secondary winding being directly connected to said second electrode and through said first-mentioned rectifying means to said first electrode, and the other end of said secondary winding being directly connected to said fourth electrode and through said second rectifying means to said third electrode.

* * * * *